(12) United States Patent
Likanapaisal

(10) Patent No.: US 9,262,561 B2
(45) Date of Patent: Feb. 16, 2016

(54) MODELING OF NON-NEWTONIAN FLUIDS IN SUBTERRANEAN RESERVOIRS

(71) Applicant: Pipat Likanapaisal, San Ramon, CA (US)

(72) Inventor: Pipat Likanapaisal, San Ramon, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 289 days.

(21) Appl. No.: 13/826,551

(22) Filed: Mar. 14, 2013

(65) Prior Publication Data

US 2014/0236557 A1    Aug. 21, 2014

Related U.S. Application Data

(60) Provisional application No. 61/765,680, filed on Feb. 15, 2013.

(51) Int. Cl.
*G06G 7/48* (2006.01)
*G06F 17/50* (2006.01)

(52) U.S. Cl.
CPC ........ *G06F 17/5009* (2013.01); *G06F 2217/16* (2013.01)

(58) Field of Classification Search
CPC ................. G06F 17/5009; G06F 2217/16

USPC .......................................................... 703/10
See application file for complete search history.

(56) References Cited

U.S. PATENT DOCUMENTS 6,023,656 A * 2/2000 Cacas et al. ..................... 702/12

OTHER PUBLICATIONS

Freddy Humberto Escobar, "Transient Pressure and Pressure Derivative Analysis for Non-Newtonian Fluids", INTECH open Science Open Minds, 2012, pp. 153-180.*
S. Vongvuthipornchai, Rajagopal Raghavan, "Well Test Analysis of Data Dominated by Storage and Skin: Non-Newtonian Power-Law Fluids", SPE Formation Evaluation, Dec. 1987, pp. 618-628.*

* cited by examiner

*Primary Examiner* — Dwin M Craig

(57) ABSTRACT

A computer-implemented reservoir prediction system, method, and software are provided for modeling the behavior of non-Newtonian fluids in subterranean reservoirs while accounting for shear-rate dependent viscosity and permeability reduction with a skin zone characterized by a traditional skin factor and an apparent skin factor. A non-Newtonian fluid injection pressure or a non-Newtonian fluid injection rate is computed at steady-state responsive to reservoir data associated with a subterranean reservoir, injection data for a non-Newtonian fluid, and fluid data for the non-Newtonian fluid. The shear-rate dependent viscosity can further be applied to a well model in numerical reservoir simulation to improve the well model.

20 Claims, 12 Drawing Sheets

FIG. 3

Reservoir
☐ Multi-Layers

K (mD)
Porosity
H (ft)
Initial Reservoir Pressure, Pi (psia)
Area (acre)
Sw = 1- So @ Sorw
Krw @ Sorw

*FIG. 4*

Injection
Calculate  ● Injection Rate  ○ Injection Pressure

Injection Pressure (psia)
rw (ft)
Polymer Concentration (%wt)

Skin
● Traditional Skin  ○ Ks + rs  ○ Skin + Ks  ○ Skin + rs

Skin

*FIG. 5A*

Injection
Calculate  ○ Injection Rate  ● Injection Pressure

Injection Rate (stbpd)
rw (ft)
Polymer Concentration (%wt)

Skin
○ Traditional Skin  ● Ks + rs  ○ Skin + Ks  ○ Skin + rs

|  | Value | Layer 1 | Layer 2 |
|---|---|---|---|
| Injection | | Rates by layers | |
| Pre-Polymer Water Inj. Rate (bbls/day) | 0 | 0 | 0 |
| Polymer Injection Rate (bbls/day) | 0 | 0 | 0 |
| Post-Polymer Water Inj. Rate (bbls/day) | 0 | 0 | 0 |
| Zero-Shear-Rate Polymer Inj. Rate (bbls/day) | 0 | 0 | 0 |
| Derived Properties | | Rates by layers | |
| Permeability Reduction Factor (Rk) | 0 | 0 | 0 |
| Apparent Skin Factor | 0 | 0 | 0 |
| Zero-Shear-Rate Viscosity (cp) | 0 | 0 | 0 |
| Model Average Polymer Viscosity (cp) (K, rw -> re) | 0 | 0 | 0 |
| Water Viscosity (cp) | 0 | 0 | 0 |

FIG. 12

MODELING OF NON-NEWTONIAN FLUIDS IN SUBTERRANEAN RESERVOIRS

CROSS-REFERENCE TO A RELATED APPLICATION

The present application for patent claims the benefit of U.S. provisional patent application bearing Ser. No. 61/765,680, filed on Feb. 15, 2013, which is incorporated by reference in its entirety.

TECHNICAL FIELD

The present invention relates to modeling fluids in subterranean reservoirs, and more particularly, to a system, method, and computer program product for modeling the behavior of non-Newtonian fluids in subterranean reservoirs.

BACKGROUND

Non-Newtonian fluids (e.g., polymer, gels) are commonly used in oil field applications such as for enhanced oil recovery (EOR), water production control, conformance control, and control of leak-off and back-flow characteristics during hydraulic fracturing. Knowledge of non-Newtonian fluids has therefore become increasingly important for optimization of field operation designs and performance prediction.

However, currently available methods and systems for predicting fluid flow in heterogeneous porous media are unable to accurately capture the flow behaviors of non-Newtonian fluids due to their complex rheological behavior, especially when in the vicinity of wells due to high flow activity. In particular, the integration of physical phenomena such as shear-thinning effect, permeability reduction, and adsorption, as well as, inaccessible pore volume into the well model is inadequate, leading to inaccuracy in prediction, or requiring additional steps for validation. Accordingly, more accurate methods and systems for predicting fluid flow of non-Newtonian fluids in heterogeneous porous media, and particularly in the vicinity of wells, are needed.

BRIEF DESCRIPTION OF THE DRAWINGS

FIG. 3 illustrates an example screenshot of an input screen for a fluid injection calculator.

FIG. 4 illustrates a partial view of the input screen for the fluid injection calculator shown in FIG. 3 where reservoir data is input.

FIGS. 5A and 5B illustrate a partial view of the input screen for the fluid injection calculator shown in FIG. 3 where injection data is input.

FIG. 7 illustrates an example screenshot of the input screen for the fluid injection calculator shown in FIG. 3 where a multi-layered reservoir is selected.

FIG. 12 illustrates an example screenshot of an output screen for a fluid injection calculator where output is provided for multiple layers of a reservoir.

DETAILED DESCRIPTION

Figure 1:
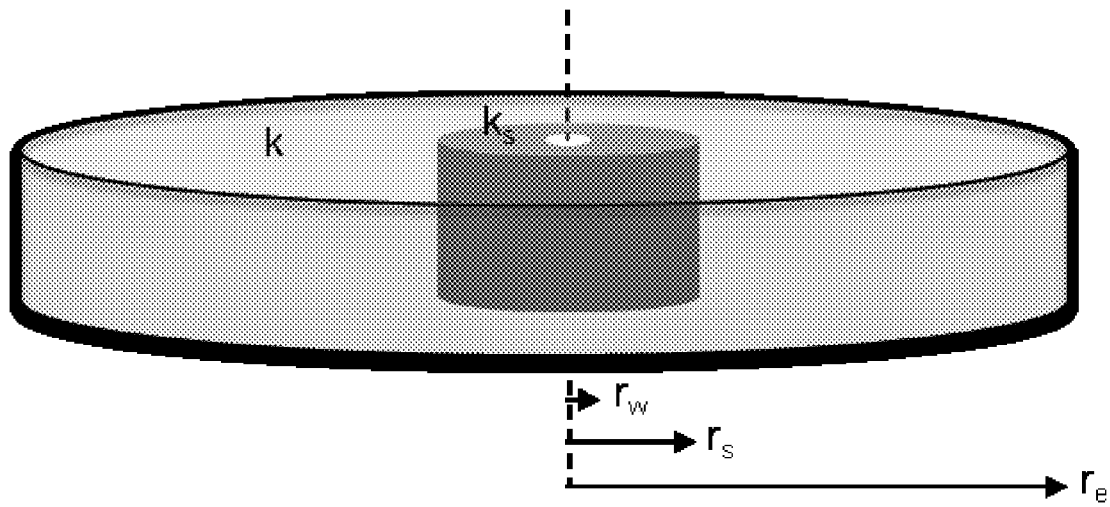
FIG. 1 is a schematic of a skin configuration for a wellbore.

Embodiments of the present invention relate to modeling of non-Newtonian fluids in subterranean reservoirs. As used herein, a non-Newtonian fluid is any fluid having a variable shear stress to shear rate ratio under different flow conditions. In contrast, a Newtonian fluid is considered to be any fluid whose shear stress and shear rate is linear (i.e., has a constant shear viscosity for all flow conditions). For brevity, the below description is described in relation to polymer. However, embodiments of the present invention can also be applied to other types of non-Newtonian fluids (e.g., gels, shear-thickening or shear-thinning fluids).

Embodiments of the present invention include a polymer model used as a stand-alone application. In some embodiments, the polymer model is used concurrently with other Newtonian fluid models, such as a surfactant or alkali-surfactant model. As will be described, the polymer model accounts for shear-thinning effect, permeability reduction, and adsorption as well as inaccessible pore volume. The integration of these physical phenomena is particularly useful for modeling flow behavior in the vicinity of wells.

Embodiments of the present invention include an analytical approach to calculate "effective" viscosity at the well, which is implemented into a numerical simulator. In general, numerical simulation involves solution of a system of equations that describes the physics governing the complex behaviors of multi-component, multi-phase fluid flow in the naturally porous media of a subterranean reservoir. The system of the equations is typically in the form of coupled nonlinear partial differential equations (PDE's). The PDE's are discretized in time and space on a given grid, and discrete equations are solved, such as by an iterative process, for a series of time steps until a prescribed time is reached. At each time step, linearization of the nonlinear system of equations (e.g., Jacobian construction), solving the linear system, and computing a subsequent system of equations is performed. Therefore, in embodiments of the present invention, the calculated "effective" viscosity at the well can be directly applied to Peaceman's well model in numerical simulation to improve well modeling. Here, the calculated "effective" viscosity can be applied by considering the outer radius ($r_e$) to be Peaceman's well radius ($r_o$). The analytical solution can be integrated at the Jacobian level (i.e., within the Newton iteration loop) such that convergence is met. Alternatively, the calculated rate of the previous Newton iteration step can be used (i.e., ignoring the convergence criteria of the non-Newtonian well model). In another alternative, the calculated rate from the previous time step could can be used (i.e., ignoring the convergence criteria of the non-Newtonian well model).

Embodiments of the present invention include a new approach to quantify the skin effect. Apparent skin factor depends on operating conditions (e.g., rate, polymer properties, reservoir properties, relative permeability). The skin zone is characterized with two parameters in the non-Newtonian fluid system. In particular, the skin (damage) zone is characterized using two parameters selected from skin radius ($r_s$), absolute permeability in the skin zone ($k_s$), and well skin factor (S).

Polymer Viscosity

For single-phase radial flow at steady state, Darcy's equation suggests that $$u = \frac{qB}{2\pi rh} = -0.001127 \frac{k}{\mu} \frac{dP}{dr}, \quad (1)$$

where q is volumetric flow rate at standard condition (stb/day), B is formation volume factor (rb/stb), r is radius distance from well (ft), h is formation thickness (ft), k is permeability (mD), $\mu$ is fluid viscosity (cP), and P is pressure (psi).

For a system of injecting polymer solution into reservoir with water and oil, oil saturation is at residual oil saturation to water-flood ($S_{orw}$). Accordingly, Equation 1 can be transformed to $$u_p = \frac{q_p B_w}{2\pi rh} = -0.001127 \frac{kk_{rw}}{R_k \mu_p} \frac{dP}{dr}, \quad (2)$$

where $k_{rw}$ is water relative permeability, $R_k$ is permeability reduction factor, subscript w indicates water-related quantity, and subscript p indicates polymer-solution-related quantity. Assuming that saturation is constant in the integral interval, Equation 2 can be arranged in integral form as $$\int_{r_w}^{r_e} \frac{\mu_p}{r} dr = -0.00708 \frac{kk_{rw}h}{R_k q_p} \int_{P_w}^{P_e} \frac{1}{B_w} dP. \quad (3)$$

Equation 3 can be applied to any shear-dependent model (i.e., shear-thickening or shear-thinning model). For example, the Chevron Extended Applications Reservoir Simulator utilizes Meter's model as a polymer viscosity model. Other simulators, such as UTCHEM (The University of Texas Chemical Compositional Simulator), incorporate Meter's model, as well as, additional polymer viscosity models. Similarly, alternative polymer viscosity models are taught by R. Byron Bird et al. in *Transport Phenomena*, 2 ed., Wiley, 2002. One skilled in the art will recognize that the above described approach can be applied to such models, as well as, other polymer viscosity models. However, for brevity, Equation 3 is applied below only to the polymer solution viscosity as defined by Meter's equation, which is written as $$\mu_p = \mu_w + \frac{\mu_p^o - \mu_w}{1 + \left[\frac{\dot{\gamma}_{eq}}{\dot{\gamma}_{1/2}}\right]^{P_\alpha - 1}}, \quad (4)$$

where $$\dot{\gamma}_{eq} = \frac{\dot{\gamma}_c |u|}{\sqrt{kk_{rw}\phi S_w}}, \quad (5)$$

$$= \frac{\dot{\gamma}_c}{\sqrt{kk_{rw}\phi S_w}} \frac{|q_p|}{2\pi rh},$$

$$= \frac{\Lambda}{r},$$

by defining $$\Lambda = \frac{\dot{\gamma}_c}{\sqrt{kk_{rw}\phi S_w}} \frac{|q_p|}{2\pi rh}, \quad (6)$$

where $\mu_p^o$ is zero-shear-rate polymer solution viscosity, $\dot{\gamma}_{1/2}$ is a shear rate which is a function of polymer concentration, $\dot{\gamma}_c$ is a dimensionless factor, $\phi$ is porosity, and $S_w$ is water saturation.

By substituting Equations 4 and 5 to the left hand side of Equation 3, gives the following:

$$\int_{r_w}^{r_e} \frac{\mu_p}{r} dr = \int_{r_w}^{r_e} \frac{1}{r}\left[\mu_w + \frac{\mu_p^o - \mu_w}{1 + \left[\frac{\Lambda}{\dot{\gamma}_{1/2}}\frac{1}{r}\right]^{P_\alpha - 1}}\right] dr, \quad (7)$$

$$= \mu_w \log r\big|_{r_w}^{r_e} + (\mu_p^o - \mu_w)\left[\frac{\log\left(\left[\frac{\Lambda}{\dot{\gamma}_{1/2}}\frac{1}{r}\right]^{P_\alpha - 1} + 1\right)}{P_\alpha - 1} + \log r\right]\bigg|_{r_w}^{r_e},$$

$$= \mu_p^o \log \frac{r_e}{r_w} + \frac{\mu_p^o - \mu_w}{P_\alpha - 1}\log\left(\frac{\left[\frac{\Lambda}{\dot{\gamma}_{1/2}}\frac{1}{r_e}\right]^{P_\alpha - 1} + 1}{\left[\frac{\Lambda}{\dot{\gamma}_{1/2}}\frac{1}{r_w}\right]^{P_\alpha - 1} + 1}\right),$$

$$= \mu_p^* \log \frac{r_e}{r_w},$$

by defining $$\mu_p^* = \mu_p^o + \frac{\mu_p^o - \mu_w}{(P_\alpha - 1)\log\frac{r_e}{r_w}}\log\left(\frac{\left[\frac{\Lambda}{\dot{\gamma}_{1/2}}\frac{1}{r_e}\right]^{P_\alpha - 1} + 1}{\left[\frac{\Lambda}{\dot{\gamma}_{1/2}}\frac{1}{r_w}\right]^{P_\alpha - 1} + 1}\right). \quad (8)$$

The integration in Equation 7 assumes that reservoir is filled from $r_w$ to $r_e$ with polymer solution of constant concentration/saturation, and steady state flow.

Incompressible:

In an incompressible system, the formation volume factor in Equation 3 is a constant. By integrating the right hand side of Equation 3, together with Equation 8, gives the following:

$$q_p = -0.00708 \frac{kk_{rw}}{BR_k} \frac{h}{\mu_p^* \log\frac{r_e}{r_w}}(P_e - P_w). \quad (9)$$

Slightly Compressible:

In slightly compressible steady-state system, the formation volume factor can be approximated as $$B = B^o[1 + c(1 + c(P^o - P))]. \quad (10)$$

Therefore, $$\int_{P_w}^{P_e} \frac{1}{B} dP = \int_{P_w}^{P_e} \frac{1}{B^o[1+c(P^o-P)]} dP, \quad (11)$$

$$= -\frac{1}{B^o c} \log[1+c(P^o-P)]\Big|_{P_w}^{P_e},$$

$$= -\frac{1}{B^o c} \log\left[\frac{1+c(P^o-P_e)}{1+c(P^o-P_w)}\right].$$

Substituting Equations 8 and 11 into Equation 3 gives the following:

$$q_p = 0.00708 \frac{kk_{rw}}{R_k B^o} \frac{h}{\mu_p^* c \log\frac{r_e}{r_w}} \log\left[\frac{1+c(P^o-P_e)}{1+c(P^o-P_w)}\right] \quad (12)$$

Permeability Reduction Factor, Zero-Shear-Rate Polymer Viscosity, and Shear-Rate-½

Permeability reduction factor ($R_k$), zero-shear-rate polymer viscosity ($\mu_p^o$), and shear rate ($\dot{\gamma}_{1/2}$) at which viscosity is the average of $\mu_p^o$ and $\mu_w$ are constant. The permeability reduction factor ($R_k$) can be calculated according to:

$$R_k = 1 + \frac{(R_{k,min}-1)b_{rk}C_{4j}}{1+b_{rk}C_{4j}}, \quad (13)$$

where $$R_{k,min} = \min\left\{\left[1 - \frac{c_{rk}(A_{p1}C_{SEP}^{S_p})^{1/3}}{\left[\frac{\sqrt{k_x k_y}}{\phi}\right]^{1/2}}\right]^{-4}, 10\right\}. \quad (14)$$

The zero-shear-rate polymer viscosity ($\mu_p^o$) can be calculated according to:

$$\mu_p^o = \mu_w\left(1 + \left(A_{p1}\left(\frac{C_4}{C_1}\right) + A_{p2}\left(\frac{C_4}{C_1}\right)^2 + A_{p3}\left(\frac{C_4}{C_1}\right)^3\right)C_{SEP}^{S_p}\right). \quad (15)$$

The shear rate ($\dot{\gamma}_{1/2}$) can be calculated according to:

$$\dot{\gamma}_{1/2} = \dot{\gamma}_{1/2}^o e^{k\left(\frac{C_4}{C_1}\right)}. \quad (16)$$

Solving Equation

As shown in Equations 6 and 8, $\mu_p^*$ is a function of $q_p$ (i.e., $q_p$ is needed to solve $q_p$ using Equation 12). Therefore, Equation 12 can be solved using an iterative scheme, 1. Select a value for $q_p^o$,
2. Calculate Equations 6 and 8 using $q_p^o$, instead of $q_p$,
3. Solve Equation 9 or 12,
4. Set $q_p^o$ to the value of $q_p$ from step 3,
5. Repeat steps 2-4 until $q_q^o = q_p$.

Skin Factor

The reservoir part in the well region has the most exposure to operations, from drilling and completion to well stimulation. With these interaction, the rock properties (specifically permeability) can be altered, creating a composite layer of rock with different properties as can be illustrated in FIG. 1.

In FIG. 1, $r_w$ represents the wellbore radius, $r_s$ represents the skin radius, $r_e$ represents the boundary radius, k represents the original permeability, and $k_s$ represents the permeability in the skin zone. Accordingly, skin is a zone surrounding the well which is invaded by mud filtrate/cement during the drilling/completion of the well (positive skin), or acid solution during well stimulation (negative skin). In an injector, a higher injection pressure is required if skin factor is positive and lower injection pressure if skin factor is negative to maintain the same injection rate without skin effect.

The flow from a well with a skin layer of different rock properties can be considered as a well completed in a composite reservoir. Equation 9 can then be rewritten for flow in the two portions of the reservoir as $$q_p = -0.00708 \frac{k_s k_{rw}}{R_{k,s}} \frac{h}{\mu_{p,s,r_w \to r_s}^* \log\frac{r_s}{r_w}}(P_s - P_w), \quad (17)$$

and $$q_p = -0.00708 \frac{kk_{rw}}{R_k} \frac{h}{\mu_{p,r_s \to r_e}^* \log\frac{r_e}{r_s}}(P_e - P_s). \quad (18)$$

Subscription s indicates that the entity is calculated based on the properties in skin zone.

Subscription $r_1 \to r_2$ indicates that the integration in Equation 7 is from $r_1$ to $r_2$.

Newtonian Fluid:

For single-phase flow of Newtonian fluid, viscosity ($\mu$) is constant and there is no permeability reduction ($R_k$). Equations 17 and 18 can be combined with $P_s$ eliminated. The joint equation can be written as $$q = -0.00708 \frac{kh}{\mu\left(\log\frac{r_e}{r_w} + S\right)}(P_e - P_w), \quad (19)$$

for $$S = \left(\frac{k}{k_s} - 1\right)\log\frac{r_s}{r_w}. \quad (20)$$

The effect from skin on flow performance can be characterized by a single parameter (i.e., skin factor). Any combinations of $k_s$ and $r_s$, which give the same skin factor according to Equation 20, will have the same impact on the flow performance of Newtonian fluid.

Non-Newtonian Fluid:

With constant viscosity in Newtonian fluid flow, skin zone can be characterized by single parameter, skin factor according to Equations 19 and 20. However, in non-Newtonian fluid flow, viscosity is shear-dependent. In the vicinity of the well, the non-Newtonian viscosity is lower due to the higher shear rate, compared to flow in areas away from the well. As a result, different combinations of $k_s$ and $r_s$ give different impact in the flow performance of non-Newtonian fluid. This is shown in the following expression, combining Equations 17 and 18 with $P_s$ eliminated, $$q_p = -0.00708 \frac{kk_{rw}}{R_k} \frac{h(P_e - P_w)}{\mu_{p,r_s \to r_e}^* \log\frac{r_e}{r_s} + \frac{k}{k_s}\frac{R_{k,s}}{R_k}\mu_{p,s,r_w \to r_s}^* \log\frac{r_s}{r_w}}. \quad (21)$$

According to Equation 21, the skin zone is necessarily characterized by two parameters ($k_s$ and $r_s$) for non-Newtonian fluid flow. Alternatively, Equation 21 can be written in a traditional form, similar to Equation 19, as $$q_p = -0.00708 \frac{kk_{rw}}{R_k} \frac{h(P_e - P_w)}{\mu_p^* \left( \log \frac{r_e}{r_w} + S^* \right)}, \tag{22}$$

for $$S^* = \frac{\mu_{p,r_s \to r_e}^*}{\mu_p^*} \log \frac{r_e}{r_s} + \frac{k}{k_s} \frac{R_{k,s}}{R_k} \frac{\mu_{p,s,r_w \to r_s}^*}{\mu_p^*} \log \frac{r_s}{r_w} - \log \frac{r_e}{r_w}, \tag{23}$$

the apparent skin factor. Note that $\mu_p^*$ is same as in Equation 8, and can be precisely written as $\mu_p^* = \mu_{p,r_w \to r_e}^*$. From Equation 23, the apparent skin factor is a direct function of $k_s$ and $r_s$; and since all $\mu_p^*$'s are function of flow rate, this apparent skin factor is a function of flow rate as well.

Apparent Skin vs. Traditional Skin

By applying traditional skin to predict non-Newtonian fluid flow (i.e., substituting S* in Equation 22 with S), certain assumptions are made. First, permeability reduction is based solely on original value. According to Equations 13 and 14, the higher permeability leads to the lower permeability reduction. In other words, for positive skin, the permeability in the damaged zone becomes even lower with the higher permeability reduction; for negative skin, the permeability reduction will be less severe. Therefore, due to the different permeability reduction in skin zone, the apparent skin has its magnitude (i.e., absolute value of the skin) amplified from the traditional skin.

Figure 2:
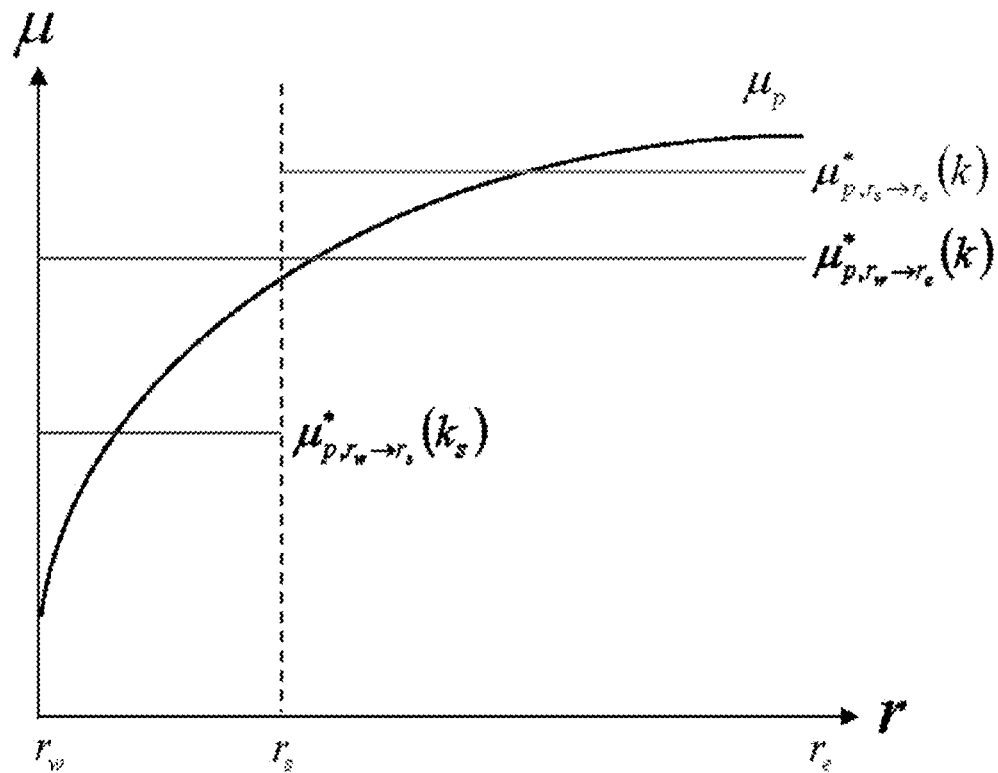
FIG. 2 is a schematic of a non-Newtonian viscosity profile within a reservoir as a function of radial distance from wellbore.

The other assumption, which relates to fluid viscosity and is illustrated in FIG. 2, impacts the apparent skin in the opposite direction. The traditional skin calculation is based on shear-independent fluid viscosity. In this case, it uses $\mu_{p,r_w \to r_e}^*$, which is integrated from wellbore to boundary with original permeability, to predict the flow performance. For an arbitrary $r_s$, it is not the entire viscosity profile that experiences the skin zone, but only the small portion in the well region. The accurate representative viscosity value for the flow within skin zone would instead be $\mu_{p,r_w \to r_s}^*$, which has a smaller value due to higher shear rate in the vicinity of the well. In comparison, since $\mu_{p,r_w \to r_s}^*$ is always less than $\mu_{p,r_w \to r_e}^*$, the apparent skin factor would have smaller magnitude (i.e., absolute value of negative or positive skin) than the traditional skin.

Therefore, the two assumptions on permeability reduction and representative viscosity have impacts on the calculation of apparent skin in the opposite direction, and it is possible that the apparent skin could have either smaller or larger magnitude compared to the traditional skin. This is depending on the contribution of which assumptions is dominating.

The above described embodiments can be implemented in the general context of instructions executed by a computer. Such computer-executable instructions may include programs, routines, objects, components, data structures, and computer software technologies that can be used to perform particular tasks and process abstract data types. Software implementations of the above described methods may be coded in different languages for application in a variety of computing platforms and environments. It will be appreciated that the scope and underlying principles of the above described embodiments are not limited to any particular computer software technology.

Moreover, those skilled in the art will appreciate that the above described embodiments may be practiced using any one or a combination of computer processing system configurations, including, but not limited to, single and multi-processer systems, hand-held devices, programmable consumer electronics, mini-computers, or mainframe computers. The above described methods may also be practiced in distributed computing environments where tasks are performed by servers or other processing devices that are linked through a one or more data communications networks. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program means recorded thereon for directing the computer processor to facilitate the implementation and practice of the above described methods. Such devices and articles of manufacture also fall within the spirit and scope of the present invention.

As will be described, the invention can be implemented in numerous ways, including for example as a method (including a computer-implemented method), a system (including a computer processing system), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

One skilled in the art will recognize that the above described analytical solutions can be utilized in various oil field applications. For example, the calculated "effective" viscosity at the well can be applied to Peaceman's well model in numerical simulation to improve well modeling. In particular, the calculated "effective" viscosity can be applied by considering the outer radius ($r_e$) to be Peaceman's well radius ($r_o$). The analytical solutions can be integrated directly within a well model of a reservoir simulator or calculated in a separate application and imported into the well model for use in numerical simulation. For example, the analytical solution can be integrated at the Jacobian level (within Newton iteration loop) for implementation to the well model in reservoir simulation. In another example, the implementation can use the calculated rate of a previous Newton iteration step. In other embodiments, the analytical solution can be utilized for chemical screening processes. FIGS. 3-12 show examples of a chemical screening tool utilizing the above described analytical solutions.

Figure 3:
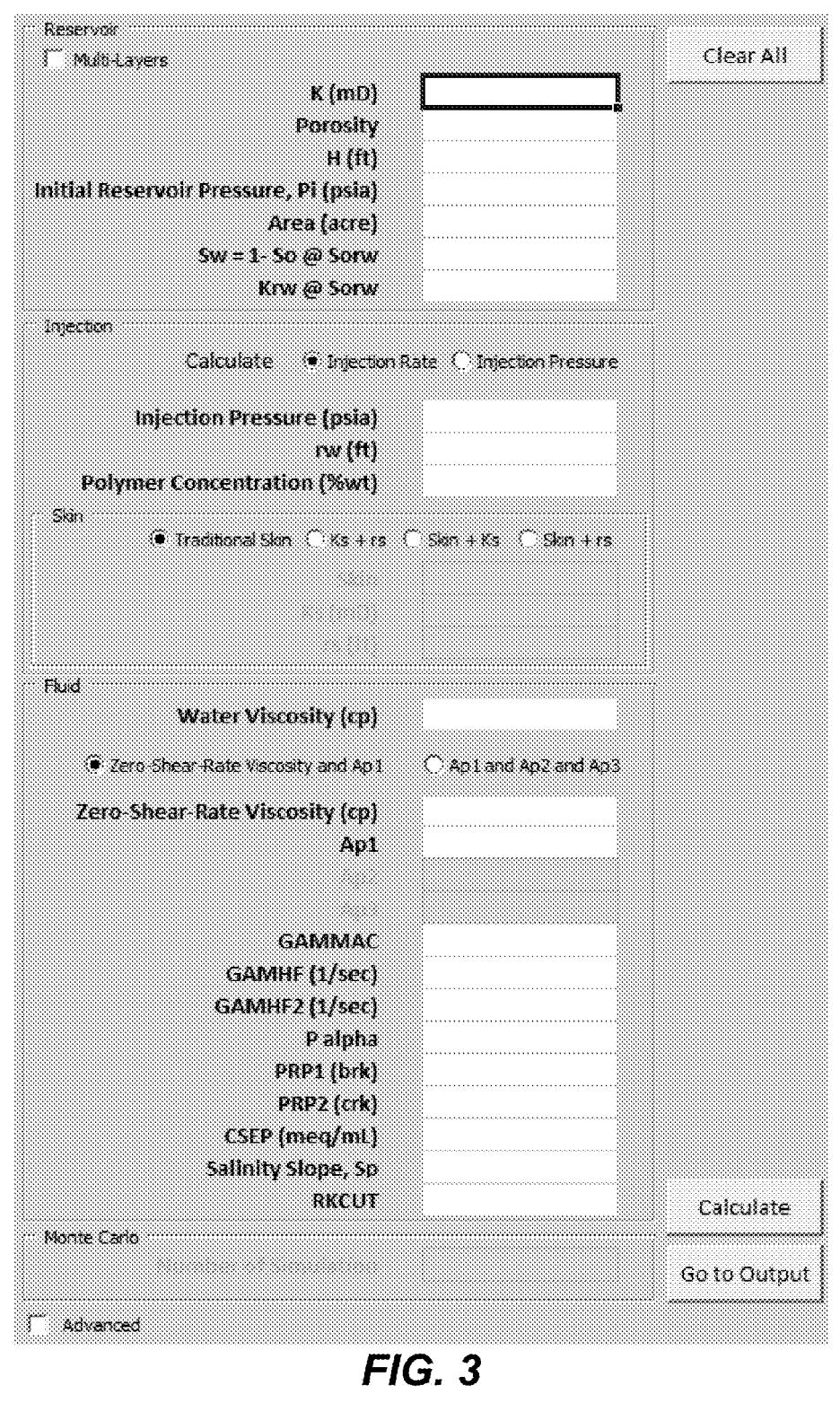

FIG. 3 illustrates an example screenshot of an input screen for a fluid calculator. As will be described in relation to FIGS. 4-9, one or more operators can input reservoir, injection, and fluid data into the fluid calculator. The data can be entered as a single value or entered as a range of values. In alternative embodiments, some data may be preloaded into the calculator or imported from other systems.

FIG. 4 illustrates a partial view of the input screen for the fluid calculator shown in FIG. 3 where reservoir data is input. In particular, values or ranges for reservoir permeability (K), total porosity, reservoir thickness (H), initial reservoir pressure ($P_i$), circular area with initial reservoir pressure at the boundary, water saturation at the residue oil saturation to waterflood ($S_w = 1 - S_o$ at $S_{orw}$), and end-point water relative permeability ($K_{rw}$ at $S_{orw}$) can be input to characterize the reservoir. As will be described later in relation to FIGS. 7-9, this input can be data for a single or multiple layered reservoir.

FIGS. 5A and 5B illustrate a partial view of the input screen for the fluid calculator shown in FIG. 3 where injection data is input. Injection data can be input according to injection rate (FIG. 5A) or injection pressure (FIG. 5B). Injection pressure is assumed to be at sand face for a single layer and at datum depth for multiple layers. Injection data also includes wellbore radius ($r_w$) and polymer concentration (% wt). Skin information is also input under injection data. As shown in FIG. 5A, well skin factor (S) is input for a traditional skin. As shown in FIG. 5B, the apparent skin zone is characterized with two parameters in the non-Newtonian fluid system. For example, the apparent is characterized using two parameters selected from skin radius ($r_s$), absolute permeability in the skin zone ($k_s$), and well skin factor (S). In embodiments, the operator selects between traditional skin and apparent skin based on the parameters to be input.

Figure 6A:
FIGS. 6A and 6B illustrate a partial view of the input screen for the fluid injection calculator shown in FIG. 3 where fluid data is input.
Figure 6B:
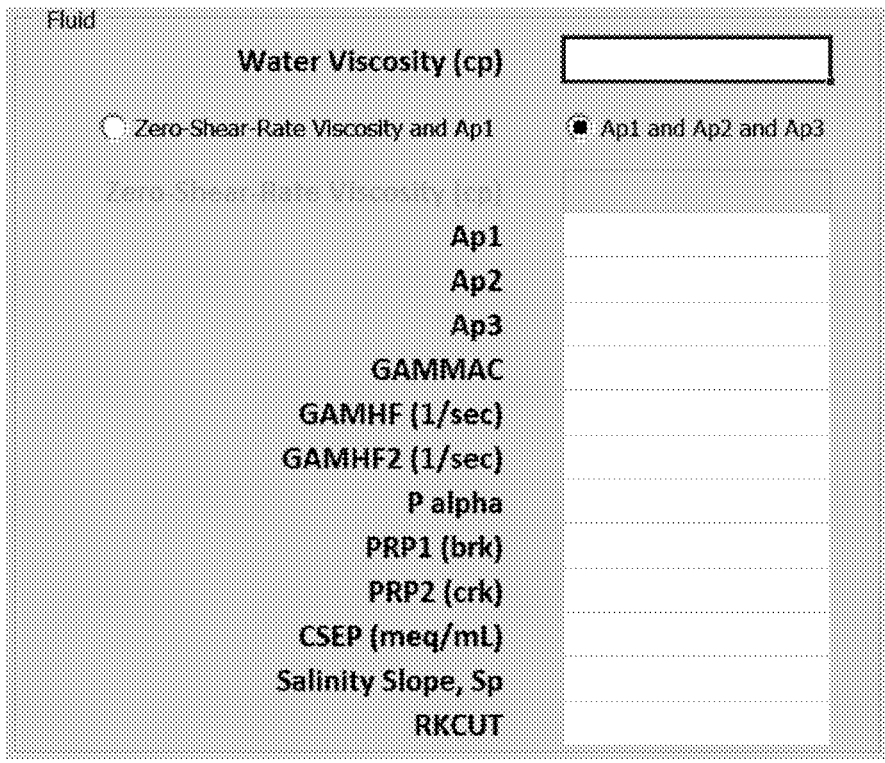

FIGS. 6A and 6B illustrate a partial view of the input screen for the fluid calculator shown in FIG. 3 where fluid data is input. In embodiments, fluid data can be generated from laboratory experiments. Fluid data includes water viscosity, zero-shear-rate viscosity or parameters used to calculate zero-shear-rate viscosity ($A_{p1}$, $A_{p2}$, $A_{p3}$), shear-rate coefficient (GAMMAC) accounting for non-ideal effects, parameters (GAMHF, GAMHF2) used to calculate shear-rate at which viscosity is the average of zero-shear-rate and water viscosity, an empirical parameter (P alpha) for calculation of polymer shear viscosity, permeability reduction factor parameters (PRP1, PRP2), a parameter for effect salinity of polymer ($C_{SEP}$), a salinity slope parameter ($S_p$) for slope between the difference of zero-shear-rate and water viscosity normalized by water viscosity and $C_{SEP}$ on a log-log plot, and a parameter ($R_{kCUT}$) for the upper limit in calculation of permeability reduction. In embodiments, the operator selects between directly inputting a value for zero-shear-rate viscosity and entering parameters used to calculate zero-shear-rate viscosity ($A_{p1}$, $A_{p2}$, $A_{p3}$).

Figure 7:
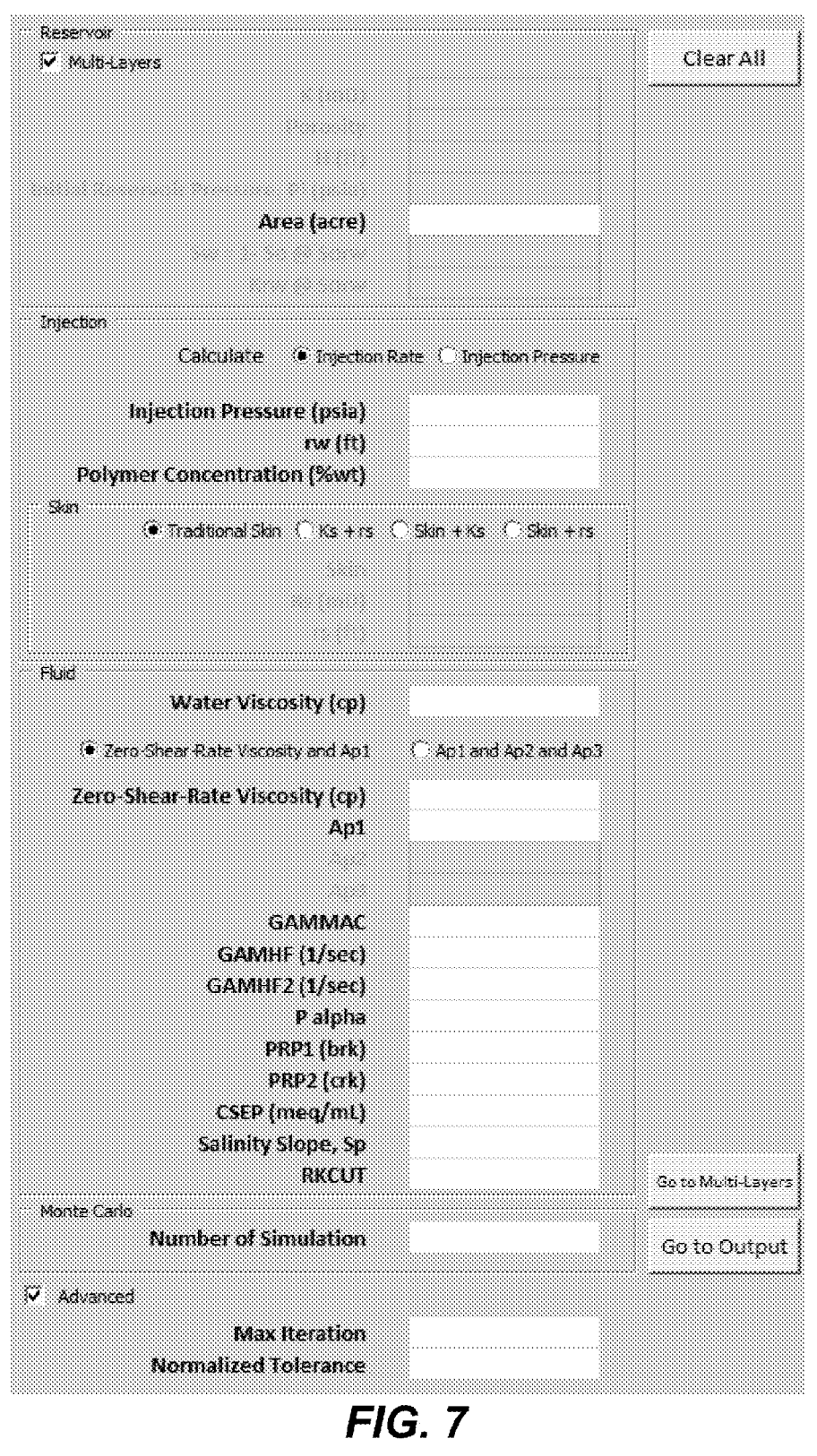
Figure 8:
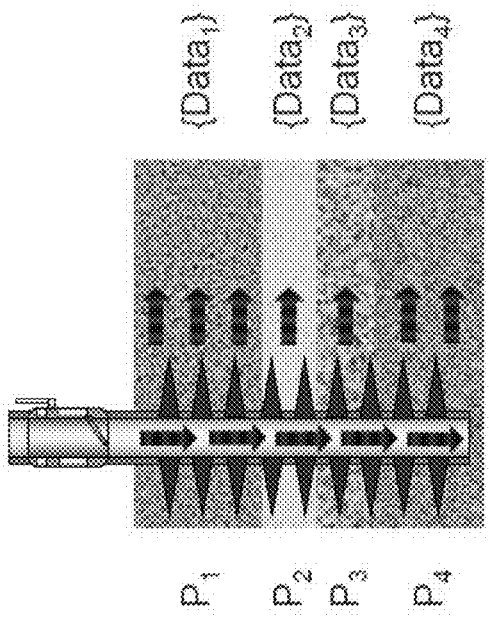
FIG. 8 is a schematic of a multi-layered reservoir.

FIG. 7 illustrates an example screenshot of the input screen for the fluid calculator shown in FIG. 3 where a multi-layered reservoir is selected. There is a checkbox in the input screen to select for calculation of multi-layer injection. By selecting multi-layer calculation, a number of parameters (e.g., layer properties) in the input page become inactive. The operator enters the circular area with initial reservoir pressure at the boundary (Area) and can then enter data for each layer to characterize the reservoir in a separate page. FIG. 8 is a schematic illustrating how each layer of a multi-layered reservoir can have different input values (Data$_1$ corresponding to $P_1$, Data$_2$ corresponding to $P_2$, Data$_3$ corresponding to $P_3$, Data$_4$ corresponding to $P_4$). In embodiments, if any ranges are input for any of the reservoir, injection, or fluid data, a number of simulations can be entered to consider combinations of parameters. In embodiments where injection rate is to be calculated, an "Advanced" checkbox can be selected to access solving iterative scheme parameters. In particular, the operator can enter a maximum number of iterations to be run and a normalized tolerance (i.e., the normalized change in injection rate between iterations) as convergence criteria.

Figure 9:
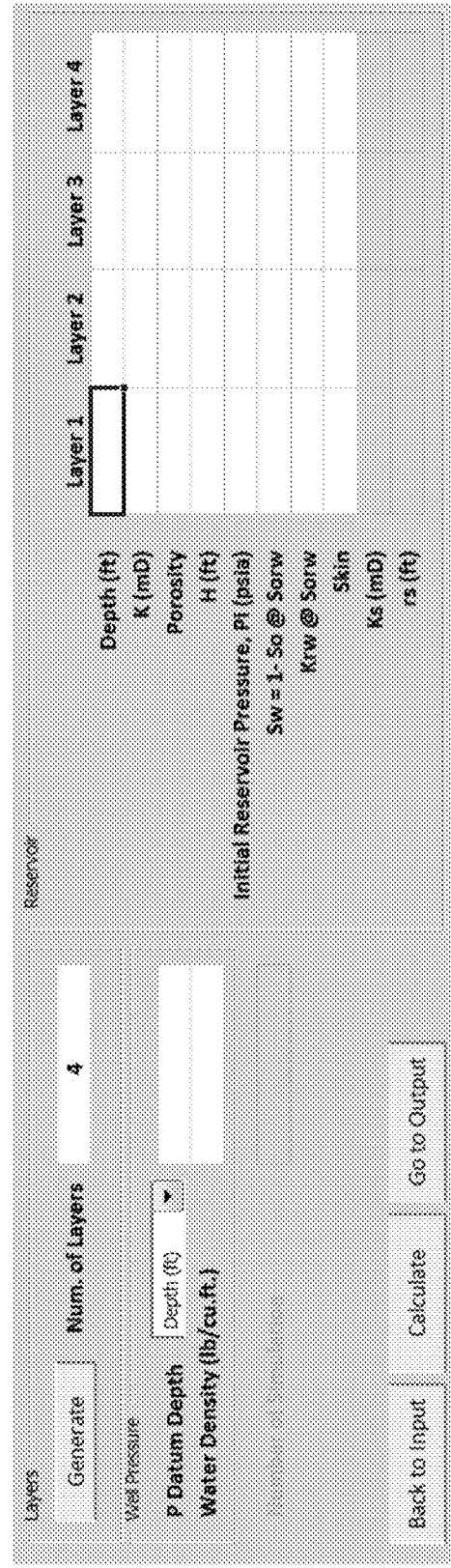
FIG. 9 illustrates an example screenshot of an input screen for a fluid injection calculator where reservoir data is input for a multi-layered reservoir.

FIG. 9 illustrates an example screenshot of an input screen for a fluid calculator where the number of layers is selected and reservoir data is input for each individual layer of a multi-layered reservoir. This can include values or ranges for reservoir permeability (K), total porosity, reservoir thickness (H), initial reservoir pressure ($P_i$), water saturation at the residue oil saturation to waterflood ($S_w=1-S_o$ at $S_{orw}$), and end-point water relative permeability ($K_{rw}$ at $S_{orw}$), well skin factor (S), absolute permeability in the skin zone ($k_s$), and skin radius ($r_s$).

As shown in FIG. 9, the depth of each reservoir layer is also specified. The operator also enters depth at which all pressure in input and output is referred to (P Datum Depth) and the water density such that hydrostatic pressure can be used to correct from datum depth to layer depth. The datum depth can be set to the surface, top comp., bottom comp. or depth. This depth information is used to calculated injection pressure at the sand face. Given injection pressure at a datum depth, based on hydrostatic pressure from the water column in the well, injection pressure at the sand face can be calculated as $$P^i = P^{ref} + \rho_w g(d^i - d^{ref}). \tag{24}$$

For the calculation of injection rate, the total injection rate is the summation of the injection rates in all layers, $$q_p^T = \sum_{i=1}^{n_l} q_p^i. \tag{25}$$

With pressure control at the well, the total injection rate can be determined by separately calculating injection rate in each layer from Equation 22. To solve Equation 22, iteration is required since $\mu^*_p$ is a function of flow rate.

For rate control, the calculation does not need iteration in single layer system. The injection from the operating condition can be used to directly calculate $\mu^*_p$ and subsequently the injection pressure. However, given the total injection rate as the operating condition in multi-layer system, the injection rate in each layer is unknown. Injection pressure at the datum depth is systematically guessed to make calculation for injection rate by layer. Then, the system is deemed to converge if the total injection rate based on the guessed pressure is different from the operating condition within prescribed tolerance.

Figure 10:
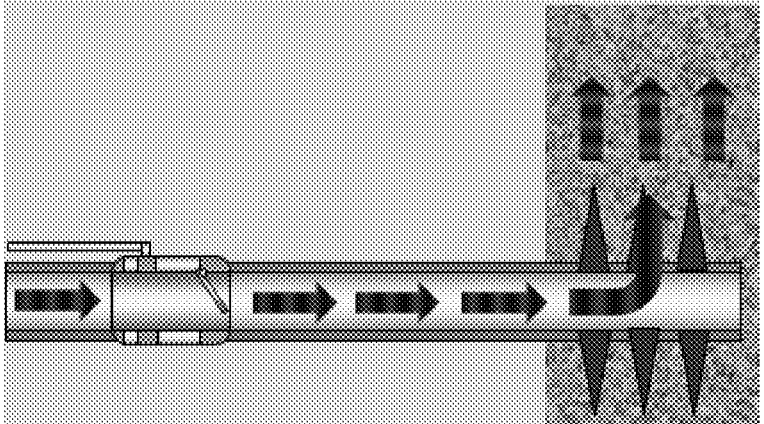
FIG. 10 illustrates an example screenshot of an output screen for a fluid injection calculator where deterministic output is provided.

FIG. 10 illustrates an example screenshot of an output screen for a fluid calculator where deterministic output is provided. In embodiments, injection rates are displayed. Injection rates can include pre-polymer water injection rate, polymer injection rate, post-polymer injection rate, and zero-shear-rate polymer injection rate. In embodiments, injection pressures are displayed. Injection pressures can include pre-polymer water injection pressure, polymer injection pressure, post-polymer injection pressure, and zero-shear-rate polymer injection pressure. In embodiments, derived properties are displayed. Derived properties include permeability reduction factor ($R_k$), apparent skin factor, zero-shear-rate viscosity, model average polymer viscosity, and water viscosity. Values that indicate unphysical values due to inappropriate inputs can be highlighted to the operator.

Figure 11:
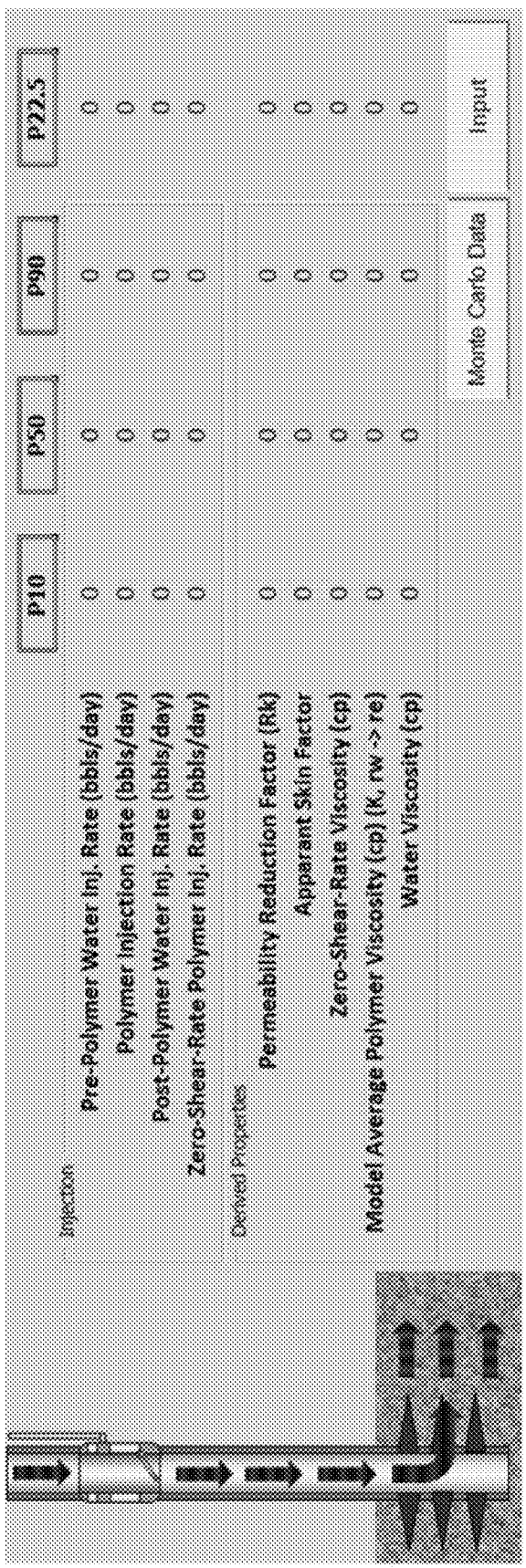
FIG. 11 illustrates an example screenshot of an output screen for a fluid injection calculator where probabilistic output is provided.

FIG. 11 illustrates an example screenshot of an output screen for a fluid injection calculator where probabilistic output is provided. In embodiments, commonly used percentiles (e.g., P10, P50, P90) can be displayed. In embodiments, different percentiles can be calculated by indicating the desired percentile in the cell in the last column. For example and as shown in FIG. 11, P22.5 is calculated. Also, if ranges are input for any of the reservoir, injection, or fluid data, Monte Carlo Data can be displayed for combinations of parameters and predictions for all the Monte Carlo results.

FIG. 12 illustrates an example screenshot of an output screen for a fluid calculator where output is provided for multiple layers of a reservoir. In embodiments, injection rates are displayed for each layer along with the total value. Injection rates can include pre-polymer water injection rate, polymer injection rate, post-polymer injection rate, and zero-shear-rate polymer injection rate. In embodiments, injection pressures are displayed for each layer along with the total value. Injection pressures can include pre-polymer water injection pressure, polymer injection pressure, post-polymer injection pressure, and zero-shear-rate polymer injection pressure. In embodiments, derived properties are displayed for each layer along with the total value. Derived properties include permeability reduction factor ($R_k$), apparent skin factor, zero-shear-rate viscosity, model average polymer viscosity, and water viscosity. Values that indicate unphysical values can be highlighted to the operator.

Figure 13:
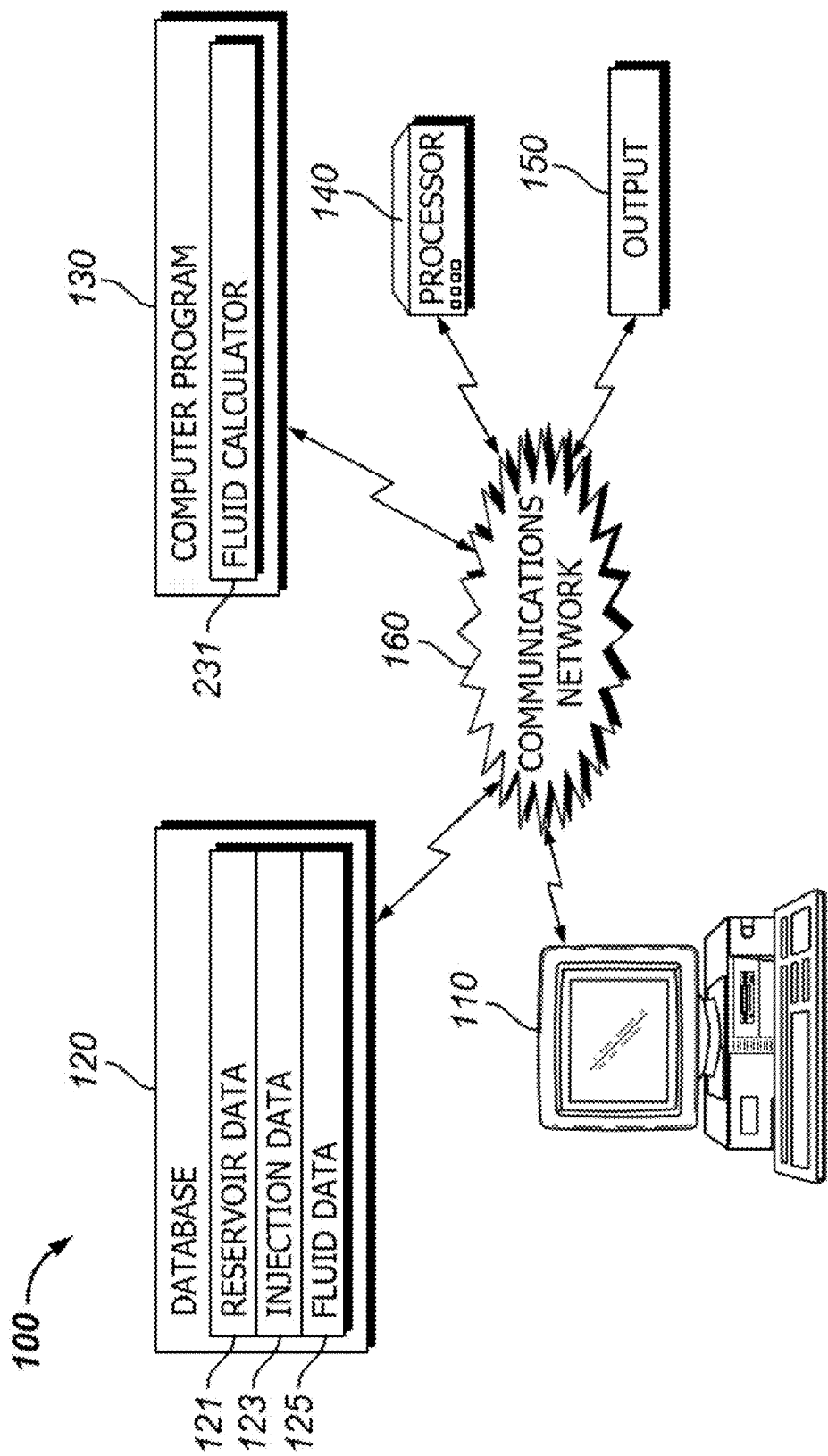
FIG. 13 shows a system for modeling the rheological behavior of non-Newtonian fluids.

FIG. 13 illustrates a system 100 for modeling the behavior of non-Newtonian fluids in subterranean reservoirs, such as by using computer-implemented methods. System 100 includes user interface 110, such that an operator can actively input information and review operations of system 100. User interface 110 can be any means in which a person is capable of interacting with system 100 such as a keyboard, mouse, or touch-screen display. Operator-entered data input into system 100 through user interface 110, can be stored in database 120. Data can also be imported into system 100 from another system (not shown) for storage in database 120. Additionally, any information generated by system 100 can be stored in database 120.

Database 120 can store user-defined variables, equations and parameters, as well as, reservoir production data, and system generated computed solutions. For example, reservoir data 121, injection data 123, and fluid data 125 are all examples of information that can be stored in database 120. As previously discussed, this can include values or ranges for reservoir permeability (K), total porosity, reservoir thickness (H), initial reservoir pressure ($P_i$), circular area with initial reservoir pressure at the boundary, water saturation at the residue oil saturation to waterflood ($S_w=1-S_o$ at $S_{orw}$), end-point water relative permeability ($K_{rw}$ at $S_{orw}$), at injection rate or pressure, wellbore radius ($r_w$), polymer concentration (% wt), skin radius ($r_s$), absolute permeability in the skin zone ($k_s$), well skin factor (S), water viscosity, zero-shear-rate viscosity or parameters used to calculate zero-shear-rate viscosity ($A_{p1}, A_{p2}, A_{p3}$), GAMMAC, GAMHF, GAMHF2, P alpha, permeability reduction factor parameters (PRP1, PRP2), $C_{SEP}$, salinity slope parameter ($S_p$), and the upper limit in calculation of permeability reduction ($R_{kCUT}$).

System 100 includes a computer program product or software 130 that is stored on a non-transitory processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, software 130 can include a plurality of modules for performing system tasks such as performing the methods previously described herein. Processor 140 interprets instructions to execute software 140, as well as, generates automatic instructions to execute software for system 100 responsive to predetermined conditions. Instructions from both user interface 110 and software 130 are processed by processor 140 for operation of system 100. In some embodiments, a plurality of processors can be utilized such that system operations can be executed more rapidly.

In certain embodiments, system 100 can include reporting unit 150 to provide information to the operator or to other systems (not shown). For example, reporting unit 150 can be a printer, display screen, or a data storage device. However, it should be understood that system 100 need not include reporting unit 150, and alternatively user interface 110 can be utilized for reporting information of system 100 to the operator.

Communication between any components of system 100, such as user interface 110, database 120, computer program 130, processor 140 and reporting unit 150, can be transferred over a communications network 160. Communications network 160 can be any means that allows for information transfer. Examples of communications network 160 presently include, but are not limited to, a switch within a computer, a personal area network (PAN), a local area network (LAN), a wide area network (WAN), and a global area network (GAN). Communications network 160 can also include any hardware technology used to connect the individual devices in the network, such as an optical cable or wireless radio frequency.

In operation, an operator initiates software 130, through user interface 110, to perform the methods described herein. Outputs from software 130 can be stored in database 120. A visual display (e.g., FIGS. 10-12) can be produced, such as through reporting unit 150 or user interface 110. For example, the output can be transformed into image data representations for display to a user or operator. The displayed information can be utilized to forecast or optimize the production performance of the subterranean reservoir, which can then be used for reservoir management decisions. For example, output (e.g., shear-rate dependent viscosity) can be utilized to improve well models used during numerical simulation.

EXAMPLE

As discussed earlier, the calculation of apparent skin depends on non-Newtonian fluid viscosity and permeability in the skin zone. Changes of flow conditions, including flow rate and skin zone configuration, can change skin value in the non-Newtonian flow performance. The following examples illustrate the behavior of the apparent skin when flow rate and skin radius are changed with traditional skin kept constant.

Figure 14:
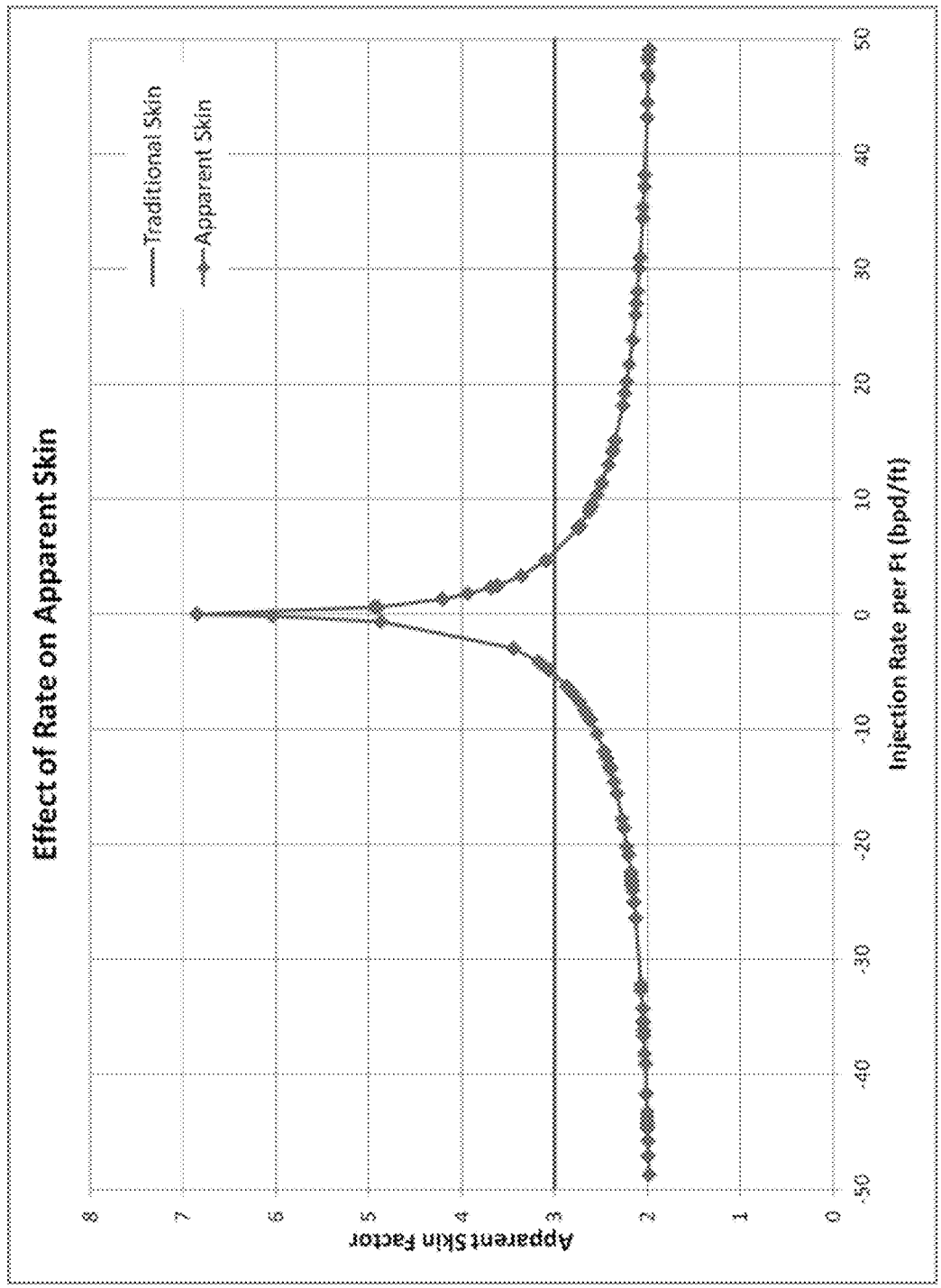
FIG. 14 is a graph illustrating the effect of injection flow rate on the apparent skin for a wellbore.

In FIG. 14, the skin configuration is fixed while different injection rate is specified to calculate injection pressure. In FIG. 14, the negative rate indicates production system. This demonstrates that the apparent skin is rate-dependent.

Figure 15:
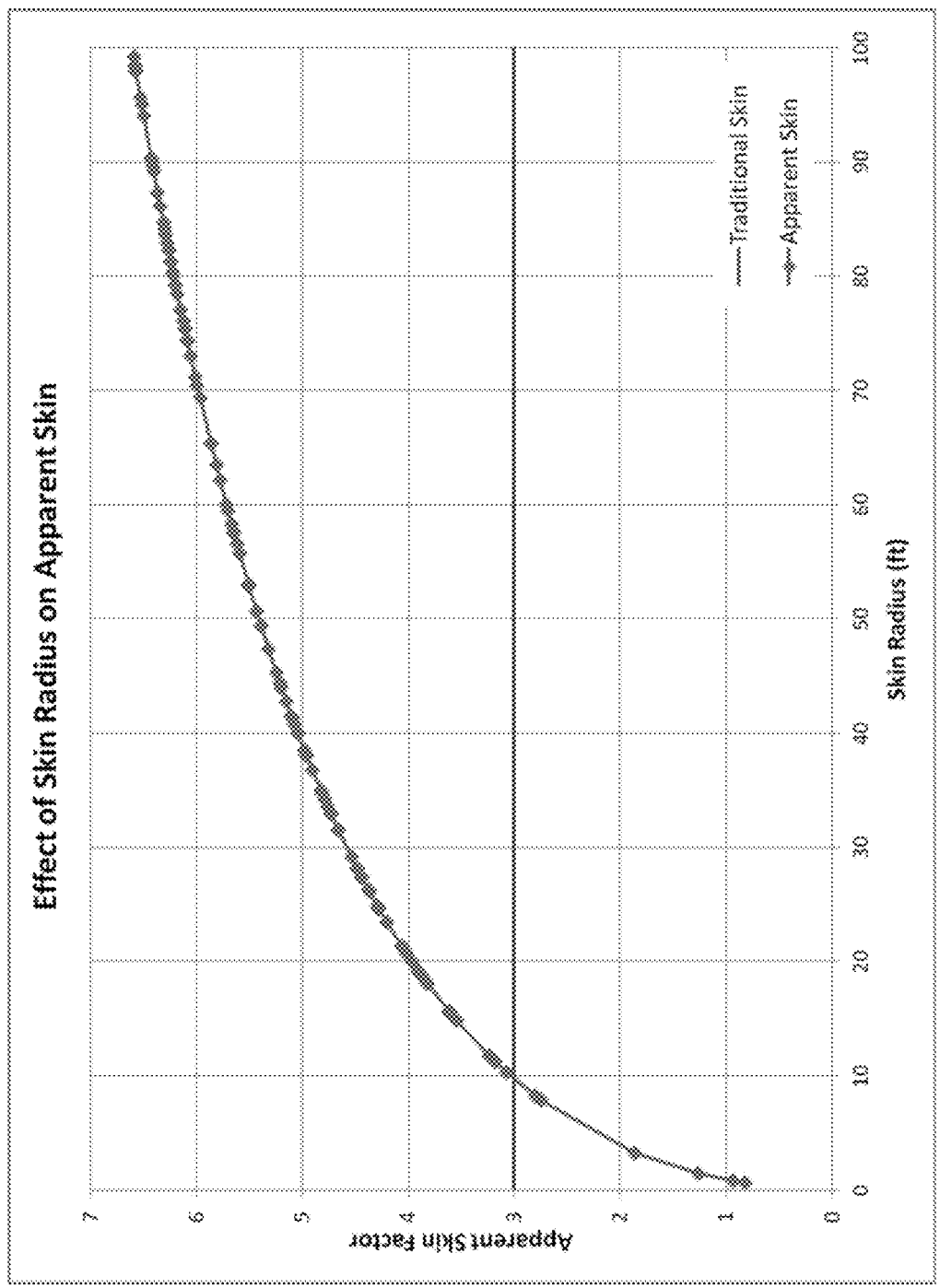
FIG. 15 is a graph illustrating the effect of skin zone configuration on the apparent skin for a wellbore.

FIG. 15 shows injection rate at a constant value. The variables in this figure are skin radius and permeability in the skin zone. However, all combination of skin radius and permeability in the skin zone yield the traditional skin factor of 3, based on Equation 20. The plot indicates that even though the traditional skin factor is kept constant, with different skin zone configuration, there are different apparent skin factors.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention. For example, while embodiments described herein refer to injection, one skilled in the art will recognize that they also can be applied to production. Additionally, while embodiments of the present disclosure are described with reference to operational illustrations of methods and systems, the functions/acts described in the figures may occur out of the order (i.e., two acts shown in succession may in fact be executed substantially concurrently or executed in the reverse order).

All references cited herein are incorporated by reference in their entirety.

What is claimed is:

1. A computer-implemented method for modeling the behavior of non-Newtonian fluids in subterranean reservoirs, the method comprising:
   (a) receiving reservoir data associated with a subterranean reservoir;
   (b) receiving injection data for a non-Newtonian fluid, wherein receiving the injection data includes receiving skin data;
   (c) receiving fluid data for the non-Newtonian fluid; and
   (d) computing a non-Newtonian fluid injection rate at steady-state based on the received data while accounting for shear-rate dependent viscosity and permeability reduction with a skin zone characterized by a traditional skin factor and an apparent skin factor.

2. The computer-implemented method of claim 1, further comprising:
   (e) applying the shear-rate dependent viscosity to a well model in numerical simulation.

3. The computer-implemented method of claim 1, wherein the skin zone is characterized using two parameters for the non-Newtonian fluid.

4. The computer-implemented method of claim 1, wherein the skin zone is characterized using two parameters selected from skin radius, absolute permeability in the skin zone, and well skin factor.

5. The computer-implemented method of claim 1, wherein the subterranean reservoir comprises multiple layers and reservoir data is input for each layer in step (a).

6. The computer-implemented method of claim 5, wherein computing the non-Newtonian fluid injection rate further comprises:
   (i) determining pressure at sand face for each layer;
   (ii) solving a radial flow equation as in single phase flow using an iterative scheme; and
   (iii) combining rates from each layer to get a total for the non-Newtonian fluid injection rate.

7. A computer-implemented method for modeling the behavior of non-Newtonian fluids in subterranean reservoirs, the method comprising:
   (a) receiving reservoir data associated with a subterranean reservoir;
   (b) receiving injection data for a non-Newtonian fluid, wherein receiving the injection data includes receiving skin data;
   (c) receiving fluid data for the non-Newtonian fluid; and
   (d) computing a non-Newtonian fluid injection pressure at steady-state based on the received data while accounting for shear-rate dependent viscosity and permeability reduction with a skin zone characterized by a traditional skin factor and an apparent skin factor.

8. The computer-implemented method of claim 7, further comprising:
   (e) applying the shear-rate dependent viscosity to a well model in numerical simulation.

9. The computer-implemented method of claim 7, wherein the skin zone is characterized using two parameters for the non-Newtonian fluid.

10. The computer-implemented method of claim 7, wherein the skin zone is characterized using two parameters selected from skin radius, absolute permeability in the skin zone, and well skin factor.

11. The computer-implemented method of claim 7, wherein the subterranean reservoir comprises multiple layers and reservoir data is input for each layer in step (a).

12. The computer-implemented method of claim 11, wherein computing the non-Newtonian fluid injection pressure comprises:
   (i) guessing a pressure at datum depth based on linear interpolation;
   (ii) determining pressure at sand face for each layer;
   (iii) solving a radial flow equation as in single phase flow using an iterative scheme;
   (iv) combining rates from each layer to get a total for the non-Newtonian fluid injection pressure; and
   (v) repeating steps (a)-(d) until the total for the non-Newtonian fluid injection pressure converges to within a prescribed tolerance.

13. A system for modeling the behavior of non-Newtonian fluids in subterranean reservoirs, the system comprising:
   a database configured to store data comprising reservoir data associated with a subterranean reservoir, injection data for a non-Newtonian fluid, and fluid data for the non-Newtonian fluid, wherein the injection data includes skin data;
   a computer processor configured to receive the stored data from the database, and to execute software responsive to the stored data; and
   a software program executable on the computer processer, the software program comprising a fluid calculator that computes a non-Newtonian fluid injection pressure or a non-Newtonian fluid injection rate at steady-state based on the received data while accounting for shear-rate dependent viscosity and permeability reduction with a skin zone characterized by a traditional skin factor and an apparent skin factor.

14. The system of claim 13, wherein the skin zone is characterized using two parameters for the non-Newtonian fluid.

15. The system of claim 13, wherein the skin zone is characterized using two parameters selected from skin radius, absolute permeability in the skin zone, and well skin factor.

16. The system of claim 13, wherein the subterranean reservoir comprises multiple layers and reservoir data is input for each layer in step (a).

17. The system of claim 16, wherein computing the non-Newtonian fluid injection rate further comprises:
  (i) determining pressure at sand face for each layer;
  (ii) solving the radial flow equation as in single phase flow using an iterative scheme; and
  (iii) combining rates from each layer to get a total for the non-Newtonian fluid injection rate.

18. The system of claim 16, wherein computing the non-Newtonian fluid injection pressure comprises:
  (i) selecting a pressure at datum depth based on linear interpolation;
  (ii) determining pressure at sand face for each layer;
  (iii) solving a radial flow equation as in single phase flow using an iterative scheme;
  (iv) combining rates from each layer to get a total for the non-Newtonian fluid injection pressure; and
  (v) repeating steps (a)-(d) until the total for the non-Newtonian fluid injection pressure converges to within a prescribed tolerance.

19. A non-transitory computer readable medium containing computer readable instructions for modeling the behavior of non-Newtonian fluids in subterranean reservoirs, the computer readable instructions comprising:
  a fluid calculator that computes a non-Newtonian fluid injection pressure or a non-Newtonian fluid injection rate at steady-state while accounting for shear-rate dependent viscosity and permeability reduction with a skin zone characterized by a traditional skin factor and an apparent skin factor, the non-Newtonian fluid injection pressure or the non-Newtonian fluid injection rate being computed responsive to reservoir data associated with a subterranean reservoir, injection data for a non-Newtonian fluid, and fluid data for the non-Newtonian fluid, wherein the injection data includes receiving skin data.

20. The non-transitory computer readable medium of claim 19, wherein the skin zone is characterized using two parameters selected from skin radius, absolute permeability in the skin zone, and well skin factor.

* * * * *